United States Patent

[11] 3,573,656

| [72] | Inventor | Enrique A. J. Marcatili<br>Rumson, N.J. |
|---|---|---|
| [21] | Appl. No. | 786,225 |
| [22] | Filed | Dec. 23, 1968 |
| [45] | Patented | Apr. 6, 1971 |
| [73] | Assignee | Bell Telephone Laboratories, Incorporated<br>Murray Hill, N.J. |

[54] LASER OSCILLATOR WITH MODE SELECTOR
7 Claims, 10 Drawing Figs.

[52] U.S. Cl. .................................................... 331/94.5
[51] Int. Cl. ..................................................... H01s 3/00
[50] Field of Search ........................................ 331/94.5,
(Laser Lit)

[56] References Cited
UNITED STATES PATENTS
3,134,837  5/1964  Kisliuk et al. ................. 331/94.5
3,426,293  2/1969  Snitzer ......................... 331/94.5

Primary Examiner—Ronald L. Wibert
Assistant Examiner—V. P. McGraw
Attorneys—R. J. Guenther and Arthur J. Torsiglieri ABSTRACT: Unwanted longitudinal modes, typically generated by a laser oscillator, are suppressed by replacing one of the two uniformly reflecting cavity mirrors with a pair of longitudinally spaced apertured mirrors. Between themselves, the apertured mirrors form an auxiliary cavity supportive of a set of longitudinal modes that are different than the set supported by the primary cavity. As a result, the laser can only oscillate at those frequencies common to both resonant cavities. The mode selectivity is made continuously variable by providing means for changing the relative size of the beam and the apertures in the auxiliary cavity mirrors.

Patented April 6, 1971

INVENTOR
E. A. J. MARCATILI
BY

Sylvan Sherman
ATTORNEY

Patented April 6, 1971

LASER OSCILLATOR WITH MODE SELECTOR

This invention relates to mode selective resonant cavities for use with laser oscillators.

BACKGROUND OF THE INVENTION

In the U.S. Pat. No. 3,134,837 and No. 3,187,270 cavity arrangements are described for limiting the number of longitudinal modes which can be sustained by a laser oscillator. In both of these patents, three or more mirrors are employed to form a multiple cavity each of which is supportive of a plurality of resonant modes. In operation, only those modes whose resonant frequencies are common to all cavities are sustained.

In both of the above-identified patents, the mode selectivity is a function of the reflectivity of one or more of the mirrors. In practice, this means that the mode selectivity is varied by physically replacing the existing mirror with another one having a different reflectivity. As such, the mode selectivity cannot be continuously varied.

SUMMARY OF THE INVENTION

In accordance with the present invention, continuously variable mode selectivity is achieved in a laser oscillator by the use of apertured mirrors. More specifically, the laser comprises an element of active laser material disposed within a first cavity defined, at one end, by a mirror of uniform reflectivity and, at the other end, by a pair of apertured mirrors. The latter are longitudinally spaced apart a distance to form a second, or auxiliary cavity. In operation, only those modes whose frequencies are common to both cavities are sustained.

Since the mode selectivity is determined by the relative size of the laser beam and the mirror apertures, means are provided for continuously varying either the beam size or the aperture dimensions.

These and other objects and advantages, the nature of the present invention, and its various features will appear more fully upon consideration of the various illustrative embodiments now to be described in detail in connection with the accompanying drawings.

DETAILED DESCRIPTION

Figure 1:
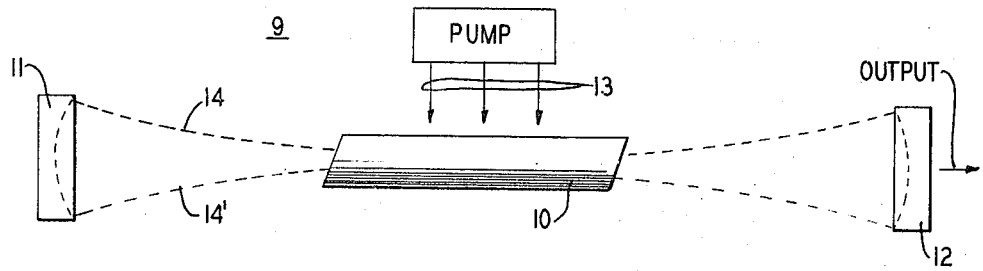
FIG. 1 shows a typical prior art laser.

Referring to the drawings, FIG. 1 shows a typical prior art laser 9 comprising an element 10 of active laser material disposed within a cavity defined by a pair of spherical mirrors 11 and 12. Means, represented by arrows 13, are provided for pumping the laser element in accordance with techniques well known in the art. An output signal is derived by making one of the cavity mirrors, 12, partially transmissive. Curves 14 and 14' outline the width of the radiation beam generated within laser 9.

Figure 2:
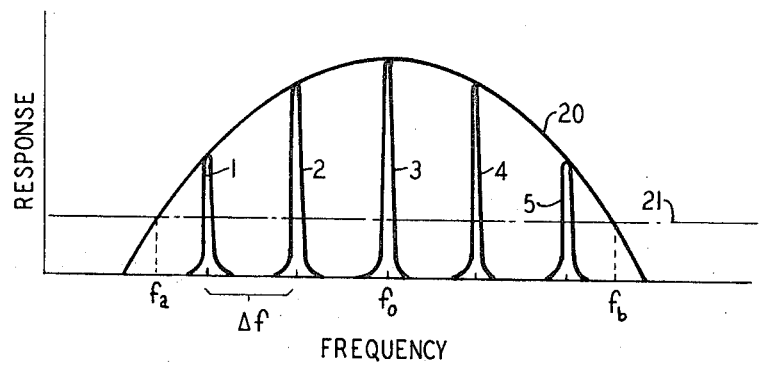
FIG. 2, included for purposes of explanation, shows the modal response of the laser of FIG. 1.

Advantageously the laser beam comprises solely the fundamental longitudinal mode. However, because the laser cavity is very much larger than the wavelengths of the signals emitted by the active material, it tends to sustain a plurality of longitudinal modes. That is, a laser oscillator is typically capable of simultaneously oscillating at a plurality of bands of frequencies whose normal center-to-center spacing $\Delta f$, is equal to $c/2L$ where $c$ is the velocity of light and $L$ is the effective cavity length. This condition is represented in FIG. 2 which shows the Doppler-broadened gain curve 20 for the laser, and the threshold level 21 at which the gain per pass for the laser exceeds the losses in the system due to useful loading, scattering losses, reflection losses, et cetera. In the absence of special measures taken to suppress them, a plurality of oscillatory modes 1—5, whose frequencies fall between $f_a$ and $f_b$, will be generated.

Figure 3:
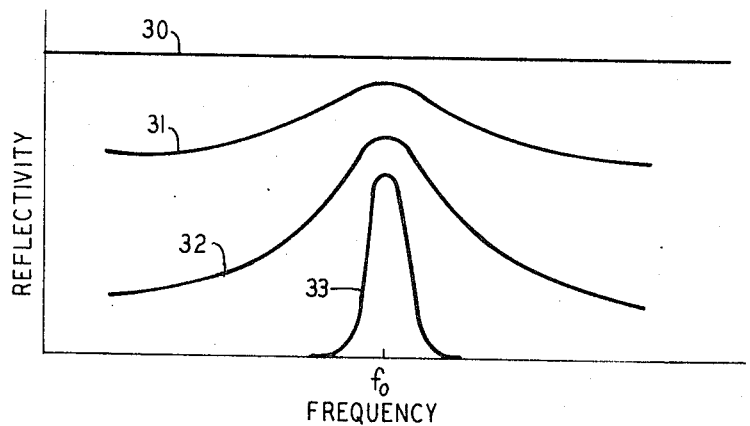
FIG. 3, included for purposes of explanation, shows a frequency dependent reflectivity characteristic.

The above brief discussion of the longitudinal modal characteristic of a typical laser oscillator presupposes that both mirrors 11 and 12 respond uniformly to all modes. If, on the other hand, the reflectivity of one of the mirrors is made frequency dependent, it is apparent that the modal characteristic of the laser would be significantly modified. That this is so can be seen by referring to FIG. 3, which shows four different frequency-reflectivity response curves. The first of these curves 30 is uniformly high ($\approx 1$), and constant as a function of frequency. As such it reflects all the cavity modes uniformly and with little loss. A reflector characterized by curve 31, on the other hand, has a reflectivity which is highest at frequency $f_o$, and which decreases somewhat for frequencies above and below $f_o$. Thus, cavity modes 1, 2, 4 and 5 experience somewhat higher losses than mode 3 as a result of this, but may, nevertheless, continue to oscillate so long as the round trip net gain is greater than unity.

As the selectivity of the reflectivity response curve increases, however, a point is reached when the net round trip gain for selected modes decreases to such a level that oscillations cease. For example, with the selectivity shown by curve 32, modes 1 and 5 would tend to cease, while only mode 3 would continue to oscillate when the selectivity is as defined by curve 33.

Figure 4:
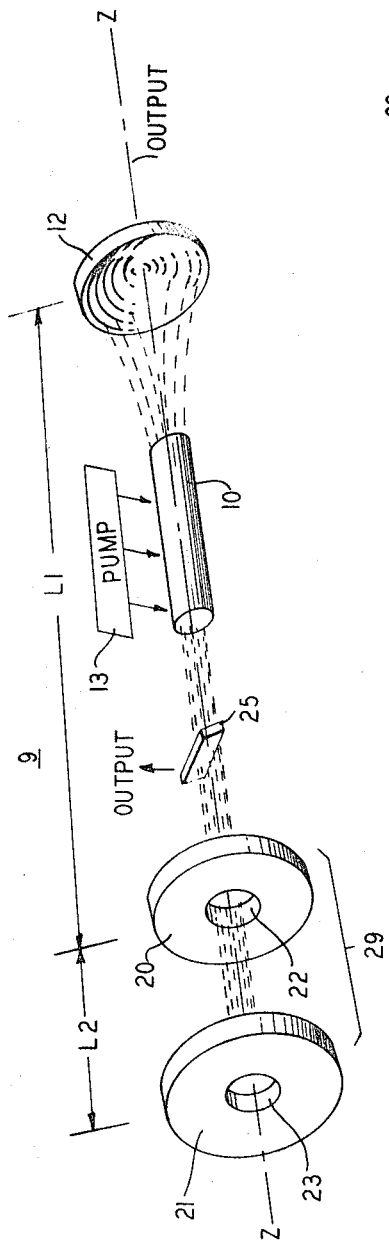
FIG. 4 shows a first embodiment of a mode selective laser oscillator in accordance with the present invention.

In accordance with the present invention, the desired reflectivity response, as a function of frequency, is realized by replacing one of the mirrors with a pair of apertured mirrors in the manner shown in FIG. 4. In this illustrative embodiment of the invention, laser 9 comprises, as before, an element 10 of active laser material disposed within a cavity defined by a pair of reflectors. One of these is a uniformly reflecting spherical mirror 12. The other reflector is a compound element 29 comprising a pair of longitudinally spaced, annular mirrors 20 and 21. As between themselves, the latter, whose centers lie along the longitudinal axis Z–Z of element 10, form an auxiliary cavity of length $L_2$. In conjunction with reflector 12, the annular mirrors form the primary laser cavity of length $L_1$. A planar glass piece 25 is located within the primary cavity for reasons which will be explained more fully hereinbelow.

In operation, radiant energy emitted by the laser material propagates along the cavity axis Z–Z towards mirror 12 and towards the compound reflector 29. The energy propagated towards mirror 12 is reflected and remains within the cavity. Energy propagating towards reflector 29, on the other hand, would tend to propagate through apertures 22 and 23 in mirrors 20 and 21 and be coupled out of both the primary and the auxiliary cavities. This would represent a substantial loss to the system which would preclude any possibility of the laser-sustaining oscillations. Accordingly, means must be provided for minimizing this loss if the laser is to operate. More particularly, this loss is selectively minimized so as to sustain oscillations at only one of the many possible longitudinal modes of operation. This is accomplished by adjusting the sizes of apertures 22 and 23 such that a sufficient portion of the radiation beam propagating therethrough is intercepted by the annular reflectors and trapped therebetween.

That portion of the wave energy trapped in the auxiliary cavity gradually builds up at the resonant frequency of the auxiliary cavity and ultimately provides a component which is coupled out through aperture 23 at the proper phase and amplitude to cancel the corresponding component of primary cavity energy coupled out through apertures 22 and 23.

Recognizing that the auxiliary cavity is also characterized by a plurality of longitudinal cavity modes, it is evident that the laser can only oscillate at those frequencies that are common to both the primary cavity and the auxiliary cavity. Since the length $L_2$ of the auxiliary cavity can be made much smaller than the length $L_1$ of the primary cavity, the mode-to-mode spacing between the auxiliary cavity modes can be made sufficiently large so that only one auxiliary cavity mode is located within the Doppler-broadened gain curve for the laser. If, in addition, this one mode is made to coincide with one of the primary cavity modes, oscillations will only be produced at this one mode.

As indicated hereinabove, one of the advantages of the present inventions resides in the fact that the mode selectivity is continuously variable. In particular, it was noted that the selectivity is a function of the relative size of the beam and the apertures in the annular mirrors. Thus, in one embodiment of the invention, the apertures are made continuously adjustable. One example of an adjustable aperture is the iris diaphragm of the type used in cameras.

Figure 6:
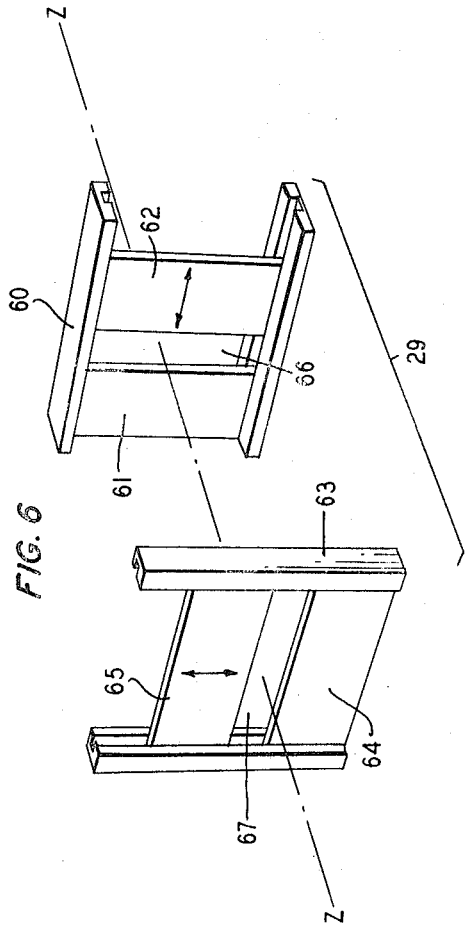
FIG. 6 shows a method of varying the mode selectivity by varying the aperture dimensions of the auxiliary cavity reflectors.
Figure 5:
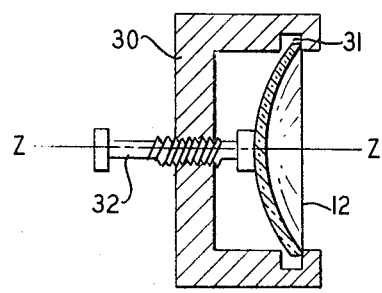
FIG. 5 shows a method of varying the mode selectivity by varying the beam width.

FIGS. 5 and 6 show alternative arrangements for varying the mode selectivity. Since, as indicated above, the selectivity is a function of the relative size of the beam and apertures 22 and 23, it is apparent that changing either the beam width or the aperture dimensions will vary the selectivity. The iris diaphragm mentioned hereinabove, changes the aperture size. In the arrangement shown in FIG. 5, the beam width at the apertures is modified by changing the radius of curvature of spherical mirror 12. To this end, the mirror is mounted in a frame 30 which is provided with a circular mirror mounting 31. The latter holds mirror 12 in a manner to permit some radial movement. The curvature of the mirror is then changed by applying pressure at the center portion of the mirror. In FIG. 5 this is done by means of a threaded member 32 extending through frame 30 and in contact with the central region of mirror 12. More specifically, the beam width at apertures 22 and 23 tends to increase as the radius of curvature of mirror 12 is increased, thus permitting more of the beam to be intercepted by reflectors 20 and 21. This, in turn, reduces the mode selectivity. Conversely, decreasing the radius of curvature of mirror 12 tends to decrease the beam size and increase the mode selectivity.

FIG. 6 shows another alternative arrangement for varying the mode selectivity. In this embodiment, each of the mirrors forming the compound reflector 29 comprises a pair of transversely spaced portions. The first of these comprises the two reflectors 61 and 62 mounted in a frame 60 and forming an elongated vertical slot 66 therebetween. The second of the pair comprises the two reflectors 64 and 65, mounted in a frame 63 and forming therebetween a horizontally elongated slot 67. The laser mode selectivity is varied by transversely displacing the reflectors relative to each other, thereby increasing or decreasing the transverse slot dimensions.

Figure 7:
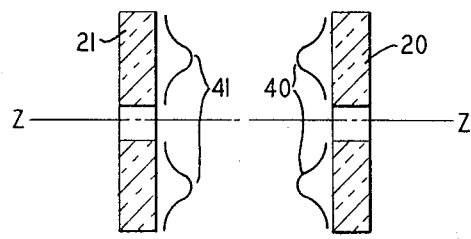
FIGS. 7 and 8 shown the field distribution in the auxiliary cavity using planar annular mirrors using curved annular mirrors.
Figure 8:
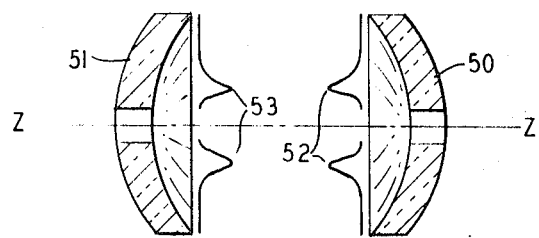

The energy in the auxiliary cavity formed by annular mirrors 20 and 21 builds up in a doughnut-shaped mode, as illustrated by curves 40 and 41 in FIG. 7. These curves show the electric field distribution as a function of position along the annular mirrors 20 and 21. When the latter are planar members, as depicted in FIGS. 1 and 4, they are advantageously made relatively large in order to minimize losses due to fringing effects at their outer peripheries. In a preferred alternative arrangement, shown in FIG. 8, the annular mirrors 50 and 51 are curved. This has the effect of focusing the wave energy and, thereby, concentrating more of it towards the centers of the mirrors and away from their outer edges, as indicated by curves 52 and 53. As a result, it is possible to reduce the mirror sizes without incurring any additional losses.

Figure 9:
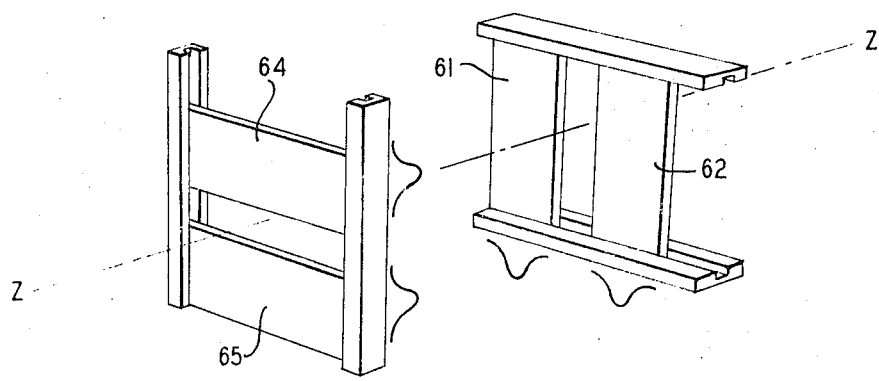
FIG. 9 shows the field distribution in the auxiliary cavity using slotted mirrors of the type shown in FIG. 6.
Figure 10:
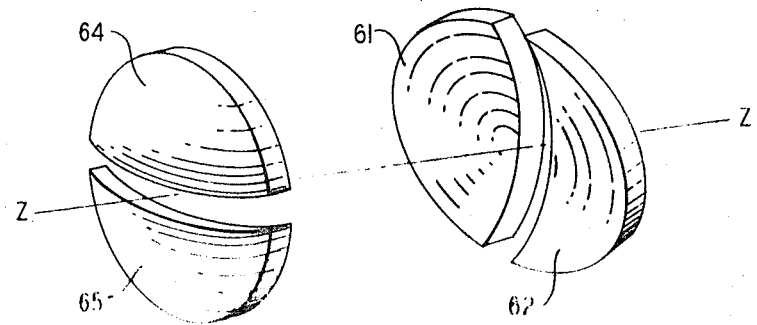
FIG. 10 shows an auxiliary cavity formed with curved slotted mirrors.

When slotted apertures are used, as in FIG. 6, the field configuration is as shown in FIG. 9. Here again, the mirrors are advantageously curved, as shown in FIG. 10, to effect some degree of focusing.

As indicated hereinabove, energy can be extracted through mirror 12 by making the mirror partially transmissive. This, however, may not be convenient if the method of varying the mode selectivity shown in FIG. 5 is used. In such a case, an alternative arrangement for extracting wave energy from the laser is used. One such alternative involves the use of a planar piece of glass 25 disposed within the primary cavity of the laser as shown in FIG. 4.

When the glass member 25 is inclined at the Brewster angle, substantially none of the beam incident therein is reflected. If, however, glass 25 is rotated away from the Brewster angle, some of the intracavity beam is reflected out of the laser cavity and constitutes the useful laser output. Clearly, other techniques can readily be devised for extracting energy from the laser.

In all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

I claim:

1. A mode selective laser comprising:
   an element of active laser material disposed within a first cavity defined at one end by a mirror of uniform reflectivity and at the other end by a pair of longitudinally spaced mirrors;
   characterized in that:
   each of said pair of mirrors has an aperture along the longitudinal axis of said cavity;
   said first cavity is supportive of a first plurality of resonant frequencies;
   in that said pair of mirrors are spaced apart a distance to form therebetween a second cavity supportive of a second plurality of resonant frequencies including one that corresponds to a resonant frequency in said first plurality of frequencies;
   and means for extracting wave energy from said laser at said one frequency.

2. The laser according to claim 1 wherein said pair of mirrors are annular mirrors having a circular aperture at their centers.

3. The laser according to claim 1 including means for varying the mode selectivity of said laser.

4. The laser according to claim 3 including means for varying the laser beam width.

5. The laser according to claim 1 wherein said first mirror is a spherical mirror of variable radius of curvature.

6. The laser according to claim 1 wherein each of said pair of mirrors comprises two, transversely spaced reflecting surfaces forming therebetween an elongated slot; and wherein the direction of the long dimension of the slot formed between one pair of reflectors forming one of said pair of mirrors is perpendicular to the direction of the long dimension of the slot formed between the other pair of reflectors forming the other of said pair of mirrors.

7. The laser according to claim 6 including means for varying the transverse distance between the reflecting surfaces of both said pairs of mirrors.